United States Patent
Reuschel et al.

(10) Patent No.: US 6,422,367 B1
(45) Date of Patent: Jul. 23, 2002

(54) MOTOR VEHICLE

(75) Inventors: Michael Reuschel, Bühl; Michael Salecker, Stuttgart/Sonnenberg; Oswald Friedmann, Lichtenau-Ulm; Georg Hommes, Ingolstadt, all of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/432,970

(22) Filed: Nov. 3, 1999

(30) Foreign Application Priority Data

Nov. 3, 1998 (DE) .......................... 198 50 556

(51) Int. Cl.⁷ .......................................... F16D 43/286
(52) U.S. Cl. ...................................... 192/54.3
(58) Field of Search .......................... 192/54.3; 477/174

(56) References Cited

U.S. PATENT DOCUMENTS

| | | | | |
|---|---|---|---|---|
| 4,958,538 A | * | 9/1990 | Yamashita et al. | 192/85 R X |
| 5,267,635 A | * | 12/1993 | Peterson et al. | 192/99 S X |
| 5,403,250 A | * | 4/1995 | Juergens | 477/174 X |
| 5,417,622 A | * | 5/1995 | Asayama et al. | 477/63 |
| 5,575,367 A | * | 11/1996 | Romanelli | 192/52.4 |
| 5,850,898 A | * | 12/1998 | Bohme et al. | 192/54.3 |
| 5,890,992 A | * | 4/1999 | Salecker et al. | 477/86 |
| 5,993,352 A | * | 11/1999 | Kosik et al. | 477/174 X |

* cited by examiner

Primary Examiner—Rodney H. Bonck
(74) Attorney, Agent, or Firm—Darby & Darby

(57) ABSTRACT

The present invention presents a method for operating a motor vehicle which has at least one clutch device. The method includes determining at least one part of a dependence of a path of at least one clutch characteristic on at least one pressure value. The pressure value relates to a pressure of a hydraulic fluid at a predetermined site. According to one embodiment of the present invention, the hydraulic pressure is detected in an area of a torque sensor which produces the hydraulic pressure dependent on a size (magnitude) of an engine torque.

77 Claims, 1 Drawing Sheet

MOTOR VEHICLE

Figure 1:
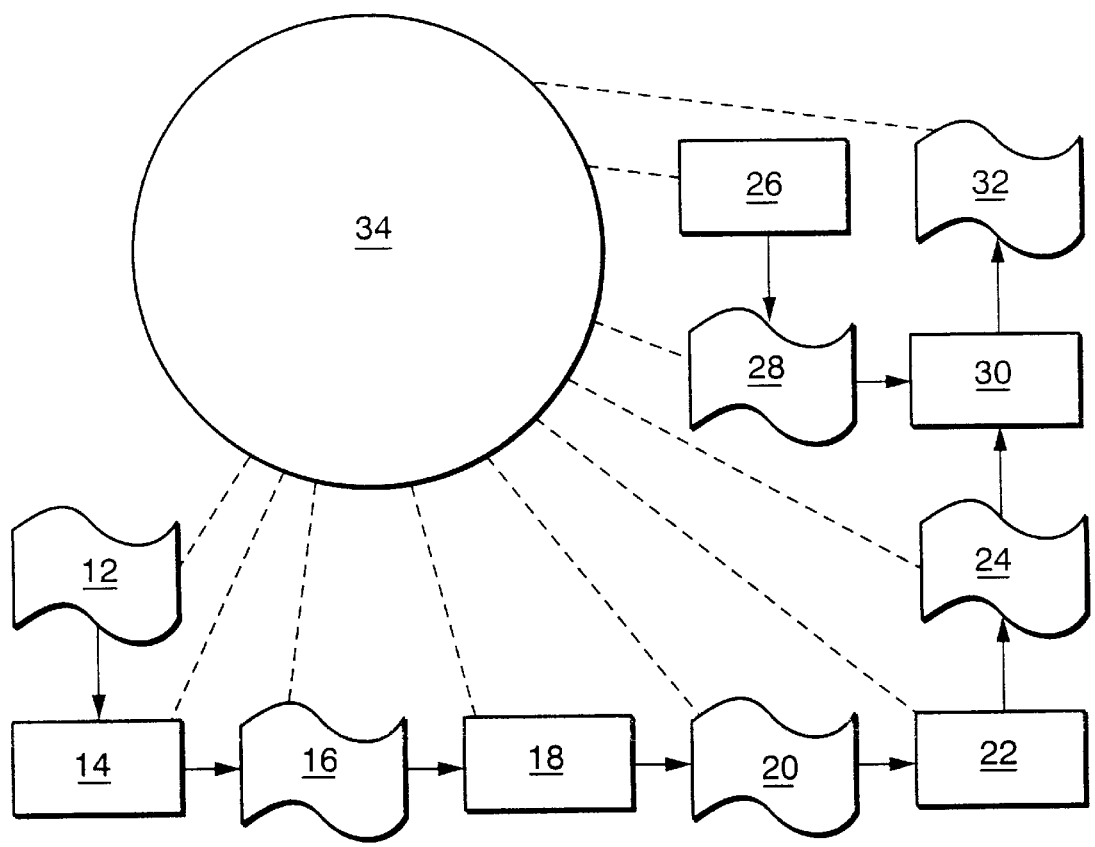

The invention relates to a method for operating a motor vehicle as well as to a motor vehicle.

Methods for operating motor vehicles as well as motor vehicles as such are already known. More particularly a method is also known by means of which the clutch characteristic of a motor vehicle can be adapted.

A method of this kind works on the principle of the so-called bite-point adaptation. By way of example here the engine torque is measured in two different positions of the clutch. A difference value is formed from these two values of which one is detected when the clutch is opened and the second is detected at a somewhat increased value which amounts to some Nm, such as about 5 Nm to 20 Nm. This difference value of the engine torque is used for the adaptation of the clutch characteristic.

This known arrangement or this known method allows an adaptation of the clutch characteristic in a motor vehicle with an accuracy which is not to be disregarded.

In certain driving situations however improvements to this known arrangement or this known method would be desirable.

By way of example it is mentioned in this connection that the known method does not function with the desired perfection if the driver pushes down on the accelerator in the opened state since the clutch then first has to be filled. In this connection it should be further mentioned that there can be a problem when opening the clutch during the creeping (crawling operation or creep in short) or stationary state of the vehicle.

The object of the invention is therefore to provide a method for operating a motor vehicle as well as a motor vehicle which always allows a reliable and accurate adaptation of the clutch characteristic, is cost-effective, requires low structural expense and is furthermore non-susceptible to breakdown.

According to the invention it is thus proposed to provide a method for operating a motor vehicle which has at least one clutch device whereby at least one part of the dependence of the path of at least one clutch characteristic on at least one pressure value is determined and/or detected.

The invention is advantageous insofar as by using at least one pressure value to determine a clutch characteristic it is possible to avoid shifting into clutch positions which were used as reference value. Both the cost of determining the clutch characteristic can be reduced and the accuracy when determining the clutch characteristic can be improved.

In a particularly preferred method according to the invention the pressure value of the pressure of a hydraulic fluid is determined at a predetermined site. A predetermined site of this kind is for example a place on or in the vicinity of a torque sensor. A torque sensor of this kind preferably produces a pressure from a torque or produces a pressure value which is representative of the size of a torque. The torque sensor preferably builds up a pressure in dependence on the size of the engine torque. This pressure is preferably substantially proportional to the engine torque.

It should be pointed out that the term of torque sensor can be widely interpreted. According to the invention it is also proposed in this sense that instead of a pressure a force or another value can be built up for example in dependence on a torque, such as the engine torque. This value which is built up can thereby also be used as a value from which a clutch torque is determined.

In a particularly preferred method according to the invention the pressure built up by the torque sensor is detected by a torque sensor pressure sensor.

It is also preferred if the hydraulic fluid whose pressure is detected at a certain site, is enclosed by the hydraulic circuit of the motor vehicle or is in connection therewith.

The object is also achieved by a method for operating a motor vehicle according to claim 9.

According to the invention it is thus proposed to convert a preferably in a predetermined dependence relative to the first value. According to the invention it is thereby proposed that a clutch characteristic is produced at least in part directly and/or indirectly from the second value.

According to a preferred embodiment of a method according to the invention the second value is thereby produced specially for producing the clutch characteristic. This means that a value is produced which is otherwise not absolutely necessary for operating the motor vehicle.

It is preferable if the second value is a pressure and/or force value and the first value is an engine torque.

It is particularly preferred if a dependence exists at least in part between the pressure and/or force value and the size of the engine torque. This dependence is preferably linear. However other dependencies are also provided according to the invention. By way of example a parabola-shaped dependency is provided.

According to the invention it is thus proposed that n vectors and/or at least one measured value and/or n pairs of values and/or n groups of values are detected for determining and/or detecting at least one part of a clutch characteristic. The n groups of values thereby each preferably include m values. n, m are thereby $\in N$. It is pointed out that m can be different in different groups of values.

Different parameters representing a certain state are thereby detected for example in one vector. This state is for example a certain position of the clutch at a predetermined time point. The same applies for groups of values and the like.

It is preferable if the detected values and/or vectors and/or groups of values and/or measured values each represent at least one point of a clutch characteristic. The measured values are thereby preferably detected at the engaged state of the clutch.

Preferably it is harmless if a part of the measured values and/or vectors and/or groups of values are detected when the clutch is substantially disengaged.

The invention is advantageous insofar as a point of a clutch characteristic can be determined through one measuring place, such as a measuring vector or the like. In known arrangements however a reference measurement is always required in the opened state of the clutch.

In order to fix the clutch characteristic preferably only those values are detected which were recorded when the clutch was engaged. It is particularly advantageous if at least one measured value and/or at least one pair of measured values and/or at least one vector and/or at least one group of measured values represents at least one predetermined state of the motor vehicle and/or the clutch. In a particularly preferred embodiment this state is characterised—at least inter alia—in that the clutch is closed substantially at least in part.

According to a particularly preferred embodiment of the invention the parameters of at least one vector and/or at least one pair of values and/or at least one group of values are detected substantially at the same time.

The invention is particularly advantageous insofar as, unlike the prior art where values for determining a point of a clutch characteristic are recorded at various times, a point of a clutch characteristic can be determined from a value detected substantially at one time point or from a number of values detected at one time point. The known arrangement automatically requires a correspondingly long time. The inertia of the known system is thus relatively high. A system according to the invention reacts correspondingly quicker.

According to a particularly preferred embodiment of the invention at least a part of the clutch characteristic is detected at least at times independently of the differences in the engine torques.

Particularly advantageous the clutch characteristic is detected substantially completely independently of any differences. It is also preferable if the clutch characteristic is determined independently of such differences of which one value relates to a substantially engaged state of the clutch and a second value relates to a substantially disengaged state of the clutch.

According to the invention a method is thus provided for operating a motor vehicle having a clutch device which allows the clutch characteristic to be determined—at least also—in the creep operation of the motor vehicle.

This particularly applies if the vehicle driver does not provide gas, thus the accelerator pedal is not activated.

According to the invention it is thus proposed that at least two different characteristics are provided for determining the clutch characteristic. These different characteristics are each used at least at times and/or at least in part.

The clutch characteristic is determined by way of example at least at times and/or at least in part in dependence on a first characteristic which depends substantially on difference torques of the engine torque. This difference torque is for example a difference torque between a substantially engaged state of the clutch and a substantially disengaged state of the clutch. The second characteristic is thereby substantially independent of the difference torques of the engine torque.

This method according to the invention extends quite simply to determining at least a part of a clutch characteristic when operating a motor vehicle wherein such methods are excluded where the clutch characteristic is detected in dependence on a reference measurement which is undertaken substantially in a disengaged state of the clutch. This means that those methods are excluded which determine the clutch characteristic from the difference engine torque between an opened clutch and a slightly raised value.

According to a particularly preferred embodiment of the invention the detected and/or determined clutch characteristic is each time an actual clutch characteristic.

It is further preferred that when detecting at least one part of a clutch characteristic predetermined peripheral conditions are provided and/or observed and/or produced.

One such peripheral condition is for example temperature-related.

The temperature relationship is basically not limited according to the invention. BY way of example the temperature relationship is such that a gearbox temperature and/or a gearbox fluid temperature and/or the ambient temperature and/or the clutch temperature and/or the temperature of another predetermined component part when detecting at least one point of the clutch characteristic lies within a predetermined interval. The temperature relationship can however also be for example such that the temperature of the aforesaid component part and/or the clutch and/or the atmosphere when detecting at least one point of the clutch characteristic is smaller than a predetermined boundary value. It can also be provided that the temperature value is a predetermined boundary value.

In a particularly preferred embodiment, the temperature is greater than a predetermined value, which preferably lies between 40° C. and 70° C., preferably between 50° C. and 60° C.

According to a particularly preferred embodiment of the invention a peripheral condition is speed-related.

A peripheral condition is preferably engine-speed-related. By way of example it is proposed that the speed and/or the engine speed lies in a predetermined area or interval. By way of example it is proposed as a peripheral condition that the engine speed lies roughly in the range between 900 rpm and 1000 rpm when detecting the clutch characteristic or a point of the clutch characteristic.

It is further preferred if the speed and/or engine speed is greater or smaller than a predetermined boundary speed. A boundary speed of this kind lies for example in the range between 900 rpm and 1000 rpm. According to the invention it is however also provided that a boundary speed of this kind lies below 900 rpm, for example at 100 rpm or 200 rpm or 300 rpm or 400 rpm, or 500 rpm or 600 rpm or 700 rpm or 800 rpm or above 1000 rpm, for example at 1100 rpm or 1200 rpm or 1300 rpm or 1400 rpm or 1500 rpm or 1600 rpm etc.

According to a particularly preferred embodiment of the invention at least one peripheral condition is hydraulic fluid related.

A peripheral condition of this kind can basically extend to any property of the hydraulic fluid or its condition. By way of example it is proposed that the hydraulic fluid has a predetermined viscosity.

According to a particularly preferred embodiment of the invention at least one peripheral condition is back pressure related. By back pressure is meant for example the pressure dissipating over different component parts of the gearbox oil circuit.

It is particularly preferred if the back pressure is formed by the drop in pressure at the radiator, injection pump and torque sensor.

According to a particularly preferred embodiment of the invention at least one point of the back pressure characteristic is determined and/or recorded and/or stored and/or taken into consideration and/or processed.

It is also particularly preferred if when determining the back pressure characteristic at least one engine speed and/or at least one temperature and/or at least one hydraulic fluid related parameter—such as for example in the form already mentioned above—is taken into consideration.

Furthermore it is particularly preferred if to determine the back pressure characteristic the clutch is fully opened in the creep operation and the torque sensor pressure value thereby detected by the torque sensor pressure sensor is stored as the reference value. This allows the back pressure to be substantially determined or estimated since when the clutch is opened the part of the pressure conditioned by the engine torque is preferably equal to 0, which is due for example to the fact that the input torque when the clutch is opened is substantially 0.

It is preferable if such calculations of the back pressure are carried out under predetermined conditions at predetermined times, by way of example in the workshop or before the initial starting up of the motor vehicle so that a back pressure characteristic is determined which is filed for example in the background or in a memory device.

A back pressure characteristic detected in this way can take into account the most varied of influencing parameters, such as for example fluid parameters, such as viscosity or the temperature or torques.

Thus for corresponding combinations the corresponding values of a back pressure characteristic can be detected each time. During operation it is then possible by solely establishing the temperature and for example the speed and/or further predetermined influencing parameters to take into consideration or take out of the calculation the non engine torque conditioned proportion at the measured pressure value.

It is also preferable however if the adaptation is undertaken basically only above predetermined temperatures or within a predetermined speed band.

It is also preferred if the back pressure characteristic is calculated in a different manner and way and preferably filed or stored.

According to a particularly preferred embodiment of the invention at least one clutch torque is determined from the detected values, such as pressure values or vectors or the like. The clutch characteristic or clutch torque is preferably determined in dependence on the detected pressure value. This pressure value preferably represents the drive torque. It should be pointed out that by drive torque in the sense of this invention is meant on the one hand the drive torque in the actual sense and on the other the input torque introduced into the clutch.

The value from which the clutch torque can be determined is preferably determined by means of a torque sensor pressure sensor.

According to a particularly preferred embodiment of the invention the clutch torque is determined as a function of at least one pressure value which is dependent on the engine torque.

It is thereby particularly preferred if the clutch torque is detected according to the function MK A=c·pMF wherein MKA is the clutch torque, pMF is the measured pressure (for example by the torque sensor pressure sensor) and c is a factor.

The factor c is for example a constant. It is also preferable if c is a variable and/or adjustable value. By way of example c is a function or a relation. A function c of this kind can depend for example on vehicle parameters. It is also preferable if it depends on parameters outside of the vehicle and/or is independent of vehicle parameters. Vehicle parameters are preferably and in particular gearbox parameters such as for example the temperature of the gearbox or speeds of the gearbox.

According to a particularly preferred embodiment of the invention the clutch torque MKA is compared with the actual clutch pressure value or clutch current value. A clutch characteristic is thereby preferably produced and/or an existing clutch characteristic is equated.

It is also preferable if instead of the clutch pressure value and/or the clutch current value—or in addition to these values—a different type of reference value is used to compare or associate the clutch torque or produce the clutch characteristic.

A reference value of this kind is for example simply a pressure value or a path stretch or a position or quite simply a current value.

In a particularly preferred embodiment the reference value is a current value which is used to operate a valve, such as a magnetic valve. A magnetic valve of this kind can be used for example for clutch operation or for hydraulic clutch operation.

According to a particularly preferred embodiment of the invention clutch characteristics are equated according to the method according to the invention. By way of example a stored clutch characteristic and a detected actual clutch characteristic are balanced.

According to a particularly preferred embodiment of the invention the stored clutch characteristic is replaced at predetermined time points and/or at predetermined situations by a new clutch characteristic or the actual clutch characteristic is corrected. Predetermined time points of this kind can be for example the work shop operation or a time point in normal operation. By way of example it can be preferable if a detected clutch characteristic replaces the stored clutch characteristic or the stored clutch characteristic is overwritten by a detected clutch characteristic. It is also preferable however if certain parameters are adapted so that the stored clutch characteristic is or need not be replaced or corrected.

It is advantageous if the adaptation or the correction of the characteristic is carried out in the quasi-stationary states.

According to a particularly preferred embodiment of the invention a predetermined pressure value, such as the torque sensor pressure value is then and/or only then detected when this pressure value is above a predetermined boundary value pressure. BY way of example the clutch torque is then only calculated or determined when the pressure value detected by the torque sensor pressure sensor lies above the back pressure or above the back pressure characteristic. It is also preferable if the adaptation is only then carried out or a clutch torque is only then determined when the measured pressure value lies above the back pressure or back pressure characteristic—e.g. plus a safety value.

According to a particularly preferred embodiment of the invention the method for operating a motor vehicle is designed so that at predetermined time points and/or in predetermined situations a clutch characteristic adaptation from the actual or ideal characteristic is undertaken.

This motor vehicle has at least one clutch, at least one torque sensor and at least one torque sensor pressure sensor for determining a pressure. The torque sensor thereby produces at least at times and/or at least in part from a torque such as the engine torque or a clutch input torque a pressure value which preferably depends on the size of the torque. At least one clutch characteristic can be determined and a clutch characteristic adaptation can be carried out inside this motor vehicle.

The object is further achieved through a motor vehicle having at least one device for carrying out the method according to the invention.

A motor vehicle according to the invention preferably has at least one CVT.

It should be pointed out that the interaction of individual features according to the invention in any combination is preferred. More particularly the combinations of features disclosed by the independent claims whilst omitting one or more features are also preferred. The methods according to the invention are also advantageous in combination.

It should also be pointed out that details of all known arrangements which do not refer to specific printed specifications are known in the first instance to the applicant and inventor so that the inventor reserves the right to protection for these insofar as they are not also known to the public.

It is pointed out that when linking features through "or" this "or" is to mean each time on the one hand the mathematical "or" and on the other hand the "or" excluding each other possibility.

It should furthermore be pointed out that the term of controlling as well as terms derived therefrom are to be widely interpreted in the sense of the invention. It includes more particularly regulating and/or controlling in the sense of the DIN.

It is evident for the expert that through the embodiments of the invention described here a number of wider modifications and designs are possible which are embraced by the invention. The invention is in particular not restricted only to the embodiments described here.

The invention will now be explained in further detail with reference to the embodiment given by way of example and without restriction.

In the drawings:

FIG. 1 shows one example of a motor vehicle according to the invention in a partial diagrammatic view.

The clutch input torque 12 or engine torque is converted by the torque sensor 14 into a pressure 16 dependent on the input torque. This pressure 16 is detected by the torque sensor pressure sensor 18 and is forwarded as pressure 20 to the computer unit 22. In the computer unit 22 the clutch torque 24 is calculated or estimated according to the formula MKA=c·pMF (MKA: clutch torque; pMF: torque sensor; c: factor) The present invention is carried out using a control device having several components or parts which perform different function. In one embodiment, the control device includes a first control component 26; a second control component 30 and a third control component 34. By adding a reference value 28 produced or controlled by the first control component 26, such as the clutch pressure value or clutch current value, at least one point of a clutch characteristic 32 or the clutch characteristic 32 is determined by means of the clutch torque 24 in the second control component 30. The third control component 34 checks in at least one part of this sequence, whether the predetermined peripheral conditions, such as for example a permissible interval for the engine speed or a predetermined minimum temperature, are met.

The invention relates to a method for operating a motor vehicle wherein a clutch characteristic (32) is determined in dependence on a pressure value (16) as well as to a method for operating a motor vehicle.

The patent claims filed with the application are proposed wordings without prejudice for obtaining wider patent protection. The applicant retains the right to claim further features disclosed up until now only in the description and/or drawings.

References used in the dependent claims refer to further designs of the subject of the independent claim through the features of each relevant dependent claim; they are not to be regarded as dispensing with obtaining an independent subject protection for the features of the dependent claims referred to.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Method for operating a motor vehicle, which has at least one clutch device, with the step of:
    determining at least one part of a dependence of a path of at least one clutch characteristic on at least one pressure value, the pressure value relating to a pressure of a hydraulic fluid at a predetermined site, wherein the hydraulic pressure is detected in an area of a torque sensor which produces the hydraulic pressure dependent on a size of an engine torque.

2. Method according to claim 1 characterized in that torque sensor builds up a pressure in dependence on the size of the engine torque.

3. Method according to claim 2, wherein the pressure build up by the torque sensor is substantially proportional to the engine torque.

4. Method according to claim 1, wherein a pressure built up by the sensor is detected by a torque sensor-pressure sensor.

5. Method according to claim 1, wherein a pressure built up by the torque sensor is detected by a torque sensor-pressure sensor.

6. Method according to claim 1, wherein the hydraulic fluid is at least one being connected to a hydraulic circuit of a gearbox and being surrounded at least in part by the hydraulic circuit of the gearbox.

7. Method according to claim 1, including:
    converting the at least one pressure value into at least a second value according to a predetermined characteristic; and determining the clutch characteristic at least in part from the second value.

8. Method according to claim 7, wherein the second value is produced to determine the clutch characteristic.

9. Method according to claim 8, including the step of converting the engine torque into at least one of a pressure and a force value.

10. Method according to claim 7, including the step: converting the engine torque into at least one of a pressure value and a force value.

11. Method according to claim 10, wherein the at least one of the pressure value and the force value is at least partially dependent on the size on the engine torque.

12. Method according to claim 11, wherein a substantially linear connection exists between at least one of the pressure and the force value and the size of the engine torque.

13. Method according to claim 10, wherein a substantially linear connection exists between at least one of the pressure value and the force value and the size of the engine torque.

14. Method according to claim 1, wherein the step of determining at least one part of the clutch includes:
    detecting at least one of n vectors and at least one measured value and n pairs of values and n groups of values each with m values, wherein n, m $\in$ N and wherein from this n points of the clutch characteristic result can be determined.

15. Method according to claim 14 characterized in that each of the detected values, vectors, groups of values and measured values represents a point of the clutch characteristic.

16. Method according to claim 15 characterized in that the point of the clutch characteristic is arranged so that the clutch is at least partially in an engaged state.

17. Method according to claim 14, wherein when determining the clutch characteristic only values are taken into consideration which are arranged so that they represent at least in part an engaged state of the clutch.

18. Method according to claim 14, wherein at least one of the at least one measured value, the at least one pair of measured values, the at least one group of measured values and the at least one vector represents a predetermined state of one of the motor vehicle and the clutch.

19. Method according to claim 18 wherein at least one of the at least one measured value, the at least one pair of measured values, the at least one group of measured values and the at least one vector represents a predetermined state of at least one of the motor vehicle and the clutch at which the clutch is closed at least in part.

20. Method according to claim 14, wherein parameters of at least one of the at least one measured vector, the at least one pair of values and the at least one group of values are detected at substantially the same time.

21. Method according to claim 1, wherein determining the at least one part of the clutch characteristic is done independently of the differences of the engine torques.

22. Method according to claim 21 with the step of:
    determining the at least one part of a clutch characteristic independently of the differences of the engine torques between at least one engaged and at least one disengaged state of the clutch.

23. Method according to claim 1, wherein the clutch characteristic can be determined at least one of at times and at least in part in a creep operation.

24. Method according to claim 1, wherein the clutch characteristic is determined according to at least two different characteristics comprising at least one of at times and at least in part.

25. Method according to claim 24 wherein
    according to at least one first characteristic the clutch characteristic is determined substantially in dependence on difference torques of an engine torque; and
    according to at least a second characteristic the clutch characteristic is determined at least at times and/or at least in part independently of difference torques of an engine torque.

26. Method according to claim 1, including determining at least a part of the clutch characteristic, the determination being free of detecting the clutch characteristic in dependence on a reference measurement which is undertaken substantially in a disengaged state of the clutch.

27. Method according to claim 24, wherein at least one of the detected clutch characteristics and determined clutch characteristics is an actual clutch characteristic.

28. Method according to claim 24, wherein when determining the at least a part of the clutch characteristic predetermined peripheral conditions at least one of: (i) are given weight and (ii) are produced.

29. Method according to claim 28, wherein at least one peripheral condition is temperature-related.

30. Method according to claim 29, wherein the at least one of the temperature when detecting the clutch characteristic and when detecting at least one point of the clutch characteristic lies within a predetermined interval.

31. Method according to claim 30, wherein the temperature when detecting at least one of the clutch characteristic and at least one point of the clutch characteristic is greater than a predetermined boundary value.

32. Method according to claim 29, wherein at least one of the temperature when detecting the clutch characteristic and at least one point of the clutch characteristic is greater than a predetermined boundary value.

33. Method according to claim 32, wherein the predetermined boundary value lies substantially between 50° C. and 60° C.

34. Method according to claim 28, wherein at least one peripheral condition is speed-related.

35. Method according to claim 34, wherein at least one peripheral condition is engine-speed-related.

36. Method according to claim 35, wherein at least one of the speed and engine speed lies in a predetermined range.

37. Method according to claim 34, wherein at least one of the speed and the engine speed lies in predetermined range.

38. Method according to claim 37, wherein the predetermined range is approximately the interval from 900 to 1000 rpm.

39. Method according to claim 34, wherein at least one of the speed and the engine speed is greater than a predetermined boundary speed.

40. Method according to claim 39, wherein the boundary speed lies in the range from 900 to 1000 rpm.

41. Method according to claim 39, wherein the boundary speed lies in the range from 900 to 1000 rpm and the predetermined range is approximately the interval from 900 to 1000 rpm.

42. Method according to claim 34, wherein at least one of the speed and the engine speed is smaller than a predetermined boundary speed.

43. Method according to claim 28, wherein at least one peripheral condition is at least partially hydraulic fluid related.

44. Method according to claim 28, wherein at least one peripheral condition is at least partially back pressure related wherein the back pressure is preferably the pressure which is dissipating as a result of the existing diaphragms.

45. Method according to claim 24, further including the step: at least one of determining, recording, storing, considering and processing at least one point of the back pressure characteristic.

46. Method according to claim 45, including the step of: considering at least one of the engine speed and the temperatures the hydraulic-fluid related parameters when determining the back pressure characteristic.

47. Method according to claim 46, including the steps:
    opening the clutch characteristic in creeping operation; and
    detecting the torque sensor pressure value.

48. Method according to claim 45, further including the steps of:
    opening the clutch characteristic in creeping operation; and
    detecting the torque sensor pressure value.

49. Method according to claim 48, with the step: storing the torque sensor pressure value as a back pressure value.

50. Method according to claim 24, further including the step of calculating at least one back pressure characteristic.

51. Method according to claim 50, wherein the detected value is a pressure value representing the drive torque.

52. Method according to claim 50, wherein the detected value is detected by a torque sensor/pressure sensor.

53. Method according to claim 52, wherein c is a function and/or a relation.

54. Method according to claim 50, further including the step of: determining the clutch torque as a function at least one pressure value dependent on the engine torque.

55. Method according to claim 50, further including the step of: determining the clutch torque according to the function:

$$MKA = c \cdot pMF,$$

wherein MKA is the clutch torque, pMF is the measured pressure by a torque sensor pressure sensor and c is a factor.

56. Method according to claim 55, wherein c is a constant.

57. Method according to claim 55, wherein c is at least one of variable and adjustable.

58. Method according to claim 55, wherein c is at least one of a function and a relation.

59. Method according to claim 24, further including the step of storing at least one back pressure characteristic.

60. Method according to claim 24, wherein at least one clutch torque can be determined from at least one of the detected values according to a predetermined characteristic.

61. Method according to claim 60, wherein the detected value is a pressure value.

62. Method according to claim 24, further including the step of: comparing the clutch torque with at least one reference value to produce a clutch characteristic.

63. Method according to claim 62, wherein the at least one reference value is a current value.

64. Method according to claim 63, wherein the at least one reference value is a clutch current value.

65. Method according to claim 24, including the step: comparing and/or associating the clutch torque with at least one reference value to produce a clutch characteristic.

66. Method according to claim 65, wherein the reference value is a current value for operating a valve.

67. Method according to claim 24, including the step of: equating the at least two clutch characteristics.

68. Method according to claim 67, including the step of: equating a stored clutch characteristic value with a predetermined clutch characteristic.

69. Method according to claim 24, including the step of: at least partially overwriting a stored clutch characteristic with a new clutch characteristic at least one of at predetermined time points and in predetermined situations.

70. Method according to claim 69, including the step of: overwriting the stored clutch characteristic with the detected clutch characteristic at least one of at predetermined time points and in predetermined situations.

71. Method according to claim 70, wherein the predetermined boundary pressure value is at least at times equal to the back pressure.

72. Method according to claim 69, wherein the predetermined boundary pressure value is at least at times equal to a back pressure.

73. Method according to claim 24, including the step of at least one of determining the clutch torque and implementing a clutch characteristic adaptation when a predetermined pressure value is at least one of being detected and lying above a predetermined boundary pressure value.

74. Method according to claim 73, wherein the predetermined boundary pressure value is dependent on a back pressure.

75. Method according to claim 24, including the step of: implementing an adaptation of the clutch characteristic, wherein the adaptation is at least one of adapting and equating an ideal and an actual clutch characteristic.

76. Method according to claim 1, wherein the at least one torque sensor produces at least at times the pressure value representing the size of engine torque; and the motor vehicle includes at least one torque sensor—pressure sensor for detecting a pressure for determining a clutch characteristic.

77. Method according to claim 1, wherein the motor vehicle includes at least a CVT.

* * * * *